No. 887,951. PATENTED MAY 19, 1908.
K. LÖHLE.
APPARATUS FOR ELEVATING SHIPS.
APPLICATION FILED JULY 16, 1906.
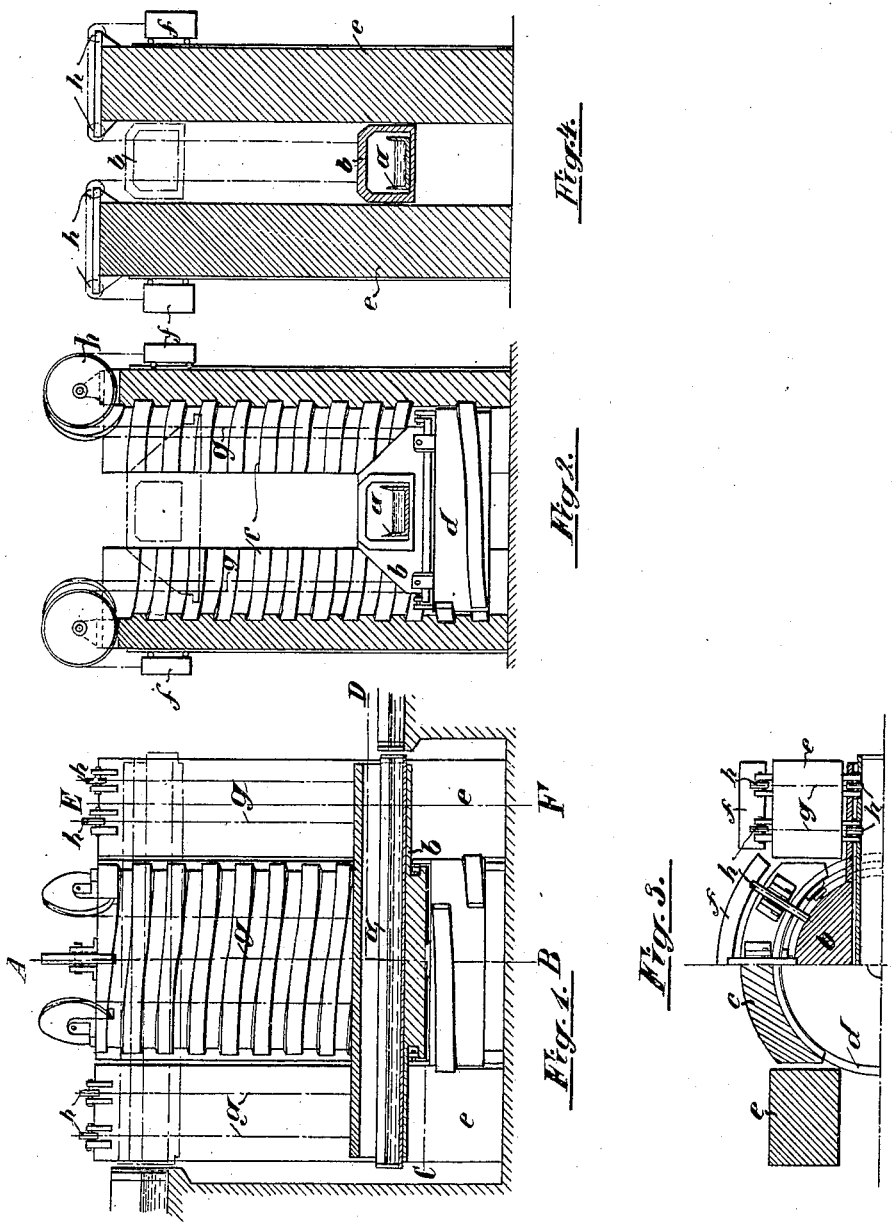

UNITED STATES PATENT OFFICE.

KARL LÖHLE, OF ZURICH, SWITZERLAND.

APPARATUS FOR ELEVATING SHIPS.

No. 887,951.  Specification of Letters Patent.  Patented May 19, 1908.

Application filed July 16, 1906. Serial No. 326,455.

*To all whom it may concern:*

Be it known that I, KARL LÖHLE, citizen of the Swiss Republic, residing at Zurich, in the Republic of Switzerland, have invented certain new and useful Improvements in Apparatus for Elevating Ships; and I do hereby declare the following to be a full, clear, and exact description of the invention, such as will enable others skilled in the art to which it appertains to make and use the same.

The present invention has for its object a ship elevating apparatus in which a device carrying a canal-trough is arranged to be raised and lowered by means of one or more screws working in split nuts or slotted internally threaded shafts, while the trough is also guided by vertical towers.

In the accompanying drawings the invention is illustrated in one form of construction.

Figure 1 shows a vertical longitudinal section through the elevating apparatus. Fig. 2 shows a section on the line A—B of Fig. 1, the screw and the trough being shown in elevation. Fig. 3 shows a plan in section principally on the line C—D of Fig. 1, part of the elevating apparatus being not in section. Fig. 4 shows a section on the line E—F of Fig. 1.

The canal-trough $a$ which serves to receive the boat or ship which is to be elevated, is supported in a cage device $b$ which is suitably built up from either closed or open framework. Beneath the cage device the screw $d$ is arranged, adapted to engage in the two parts $c$ of the internally threaded shaft.

The cage device $b$ extends outward through the vertical slots left between the parts of the internally threaded shaft and is so guided vertically outside between towers $e$ that the trough and its supporting frame cannot turn about the vertical axis.

For facilitating the upward and downward movement of the trough the weight of the whole construction which is to be raised is balanced by counter weights $f$ which can move up and down outside the internally threaded shaft and the guiding towers. The counter weights are hung on cables or chains $g$ which are guided over pulleys $h$ which latter are carried in bearing supports on the shaft $c$ and the guiding towers $e$. The cables or chains are attached to the supporting cage $b$.

The screw $d$ must be hung revolubly upon the supporting cage because the weight of this screw should also be balanced by the counter weights; in case the screw is arranged above the supporting cage it must be revolubly borne on the latter.

The guiding towers may be independent of the internally screwed shaft parts as is shown or they may be connected with these latter.

What I claim and desire to secure by Letters Patent is:—

1. In a ship elevating apparatus, the combination, with a receiving trough, an internally threaded slotted shaft inclosing the medial portion of the trough with the trough extremities extending beyond the shaft through the slots, and a screw spindle working in the threaded shaft and supporting the trough, of vertical trough-guiding means arranged exterior to the shaft.

2. In a ship elevating apparatus, the combination, with a receiving trough, an internally threaded slotted shaft inclosing the medial portion of the trough with the trough extremities extending beyond the shaft through the slots, and a screw spindle working in the threaded shaft and supporting the trough, of vertical guiding towers arranged exterior to the shaft on each side of the trough extremities.

In testimony whereof I hereunto affix my signature in the presence of two witnesses.

KARL LÖHLE.

Witnesses:
    THEODOR MAAG,
    JACQUES WIGSS.